US011273634B2

United States Patent
Anderson et al.

(10) Patent No.: US 11,273,634 B2
(45) Date of Patent: Mar. 15, 2022

(54) FLUIDIC DIES

(71) Applicant: Hewlett-Packard Development Company, L.P., Spring, TX (US)

(72) Inventors: Daryl E. Anderson, Corvallis, OR (US); Eric Martin, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,918

(22) PCT Filed: Nov. 22, 2017

(86) PCT No.: PCT/US2017/063019
§ 371 (c)(1),
(2) Date: May 1, 2020

(87) PCT Pub. No.: WO2019/103737
PCT Pub. Date: May 31, 2019

(65) Prior Publication Data
US 2021/0178756 A1   Jun. 17, 2021

(51) Int. Cl.
*B41J 2/045* (2006.01)
*G01K 15/00* (2006.01)

(52) U.S. Cl.
CPC ........ *B41J 2/04508* (2013.01); *B41J 2/0458* (2013.01); *B41J 2/04563* (2013.01); *B41J 2/04581* (2013.01); *G01K 15/00* (2013.01)

(58) Field of Classification Search
CPC .................................................. B41J 2/04563
See application file for complete search history.

(56) References Cited

U.S. PATENT DOCUMENTS

| | | | | |
|---|---|---|---|---|
| 4,475,823 A | * | 10/1984 | Stone | G01K 15/005 374/1 |
| 4,968,946 A | * | 11/1990 | Maier | G01F 23/24 324/649 |
| 5,646,655 A | * | 7/1997 | Iwasaki | B41J 2/04515 347/17 |
| 6,249,299 B1 | | 6/2001 | Tainer | |
| 7,924,088 B1 | | 4/2011 | Chiang et al. | |
| 8,662,616 B2 | | 3/2014 | Steurrys et al. | |

(Continued)

FOREIGN PATENT DOCUMENTS

JP       2000334958 A  * 12/2000
WO    WO-2016018361 A1    2/2016

OTHER PUBLICATIONS

Machine generated English translation of JP2000334958 "Recording Apparatus and Recording Head" to Okifuji; retrieved via worldwide.espacenet.com on Apr. 28, 2021; 17pp.*

(Continued)

*Primary Examiner* — Shelby L Fidler
(74) *Attorney, Agent, or Firm* — Fabian VanCott

(57) ABSTRACT

A fluidic die may include at least two zones, a reference temperature sensor communicatively coupled to each zone, a calibration voltage generator coupled between the zones and the reference temperature sensor, and a calibration loop circuit associated with each zone to calibrate each zone based on a voltage provided by the reference temperature sensor.

19 Claims, 7 Drawing Sheets

(56) References Cited

U.S. PATENT DOCUMENTS

| | | | |
|---|---|---|---|
| 9,676,190 B2 | 6/2017 | Clark et al. | |
| 9,862,187 B1* | 1/2018 | Mu | B41J 2/04588 |
| 2007/0291066 A1* | 12/2007 | Takabayashi | B41J 2/17509 |
| | | | 347/17 |
| 2012/0218034 A1 | 8/2012 | Turullols et al. | |
| 2013/0155142 A1* | 6/2013 | Browning | B41J 2/14145 |
| | | | 347/19 |
| 2014/0278185 A1* | 9/2014 | Landmann | G01L 27/005 |
| | | | 702/98 |

OTHER PUBLICATIONS

Thomas, K. J., "The Development of the Toner Density Sensor for Closed-Loop Feedback Laser Printer Calibration", 2009, 136pgs, http://libres.uncg.edu/ir/uncc/f/Thomas_uncc_0694D_10011.pdf.

* cited by examiner

FLUIDIC DIES

BACKGROUND

Fluidic dies may include architectures and elements that move fluid within the fluidic die and/or that eject fluid from the fluidic die. Printing devices may include a pen used to eject fluid onto the surface of media. The pen may be a page-wide array of fluidic dies, a fluid cartridge including at least one fluidic die, or any number of devices that may serve this function. Some of the fluidic dies include a number of fluid chambers fluidically coupled to a number of fluid ejection chambers in which an actuator such as a resistive element or a piezoelectric device is located. The actuators may cause displacement of fluid within the fluid ejection chambers to eject a metered amount of the fluid out of the fluid ejection chambers through an orifice such as a nozzle. Further, in additive manufacturing processes such as those that use a three-dimensional (3D) printing device, the fluidic die may eject build materials, adhesives, and other fluids that may be used to build a 3D object. Still further, in fluidic dies that move fluid to various passageways within the fluidic die, fluidic pumps such as micro-fluidic pumps may be used to move the fluid.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
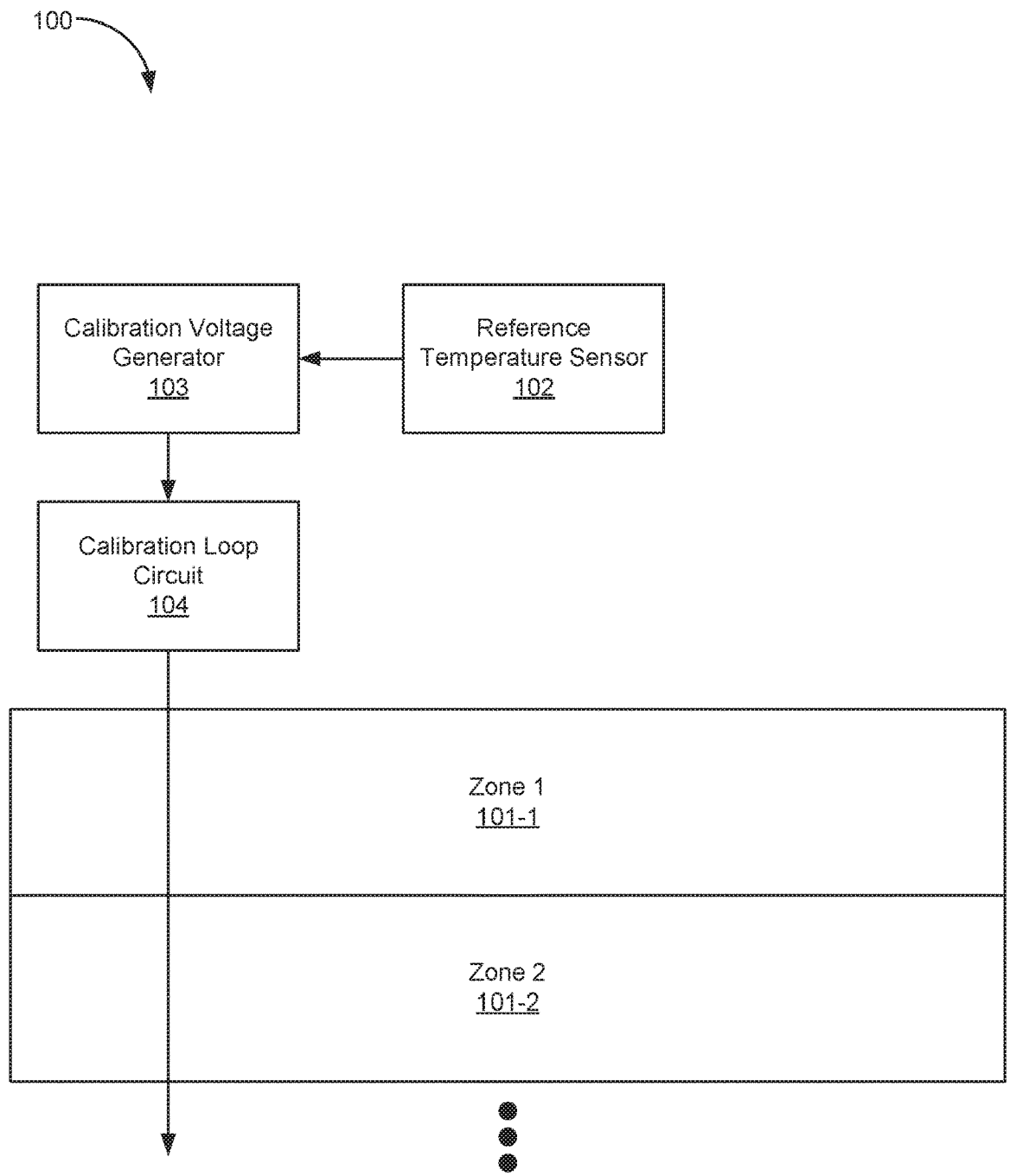
FIG. 1 is a block diagram of a fluidic die, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

During operation of the fluidic die, the die may increase in temperature or otherwise fluctuate from an operating temperature including increases and decreases beyond the operating temperature. This increase in temperature may be the result of the firing of the heating element or other operational circuits in the fluidic die, the temperature of the environment the die is operating in, or other mechanical devices operating within or near the fluidic die. Further, the increase in temperature of the fluidic die may not be uniform throughout the fluidic die, and a number of temperature differences may appear throughout the length and width of the fluidic die. A number of sensors may be located along the fluidic die to measure temperatures along the fluidic die, and output a voltage indicative of those temperatures. This temperature variation along the fluidic die may vary with, for example, complementary metal-oxide-semiconductor (CMOS) process variations where two separate sensors within the fluidic die may not produce the same voltages with or without the locations of those two separate sensors being at the same temperature.

In an example where the fluidic die is a fluid ejection device, as the temperature changes and, more specifically, as the temperature increases, the fluid ejection characteristics of the fluidic die may also change as well as the viscosity of the fluid being ejected. As a result, the quality of print rendered by the fluid ejection device may change based on the temperatures along the fluidic die. Temperature sensors may be provided to monitor the changes in temperature in multiple zones on the fluidic die. These sensed temperatures may be used to compensate for temperature variation in enabling fluid actuators on the fluidic die. In one example, the energy used to actuate an actuator may be adjusted based on temperature. However, this monitoring may not prevent the fluidic die from ejecting inconsistent drop weights of fluid, inconsistent velocities of fluid ejected, inconsistent shapes of droplets of the fluid ejected, and inconsistent conglomeration of the fluid during ejection. However, if the temperature of the fluidic die and its multiple zones are not sensed consistently along the width and/or length of the fluidic die, the actual temperature of different zones or areas of the fluidic die may not be consistent and other circuits in the fluidic die may not accurately compensate for temperature variations. This may result in varying and different print characteristics from the actuators along the fluidic die.

Examples described herein provide a fluidic die. The fluidic die may include at least two zones, a reference temperature sensor communicatively coupled to each zone, a calibration voltage generator coupled between the zones and the reference temperature sensor, and a calibration loop circuit associated with each zone to calibrate each zone based on a voltage provided by the reference temperature sensor.

The calibration loop circuit within each zone may include a summing amplifier to output a voltage representative of a voltage from a zone temperature sensor, a comparator to compare the voltage from the summing amplifier with the voltage provided by the reference temperature sensor, an offset counter to increment or decrement by a value based on a difference between the voltage provided by the reference temperature sensor and the voltage from the zone temperature sensor, and a digital-to-analog converter (DAC) to convert the output of the offset counter to an offset voltage and send the offset voltage to the summing amplifier. For a number of iterations, the summing amplifier sums the offset voltage with the voltage from the zone temperature sensor, the comparator compares the summed voltage with the voltage provided by the reference temperature sensor, and the offset counter increments by the value based on the comparison between the summed voltage and the voltage provided by the reference temperature sensor.

The fluidic die may include a sample and hold device to sample the voltage provided by the reference temperature sensor and hold a value defining the voltage provided by the reference temperature sensor at a constant level for a period of time. The at least two zones may be equal to a number of fluid actuator primitives in the fluidic die. The fluidic die may include non-volatile memory. The non-volatile memory stores calibration data provided by the calibration loop circuit. The reference temperature sensor runs a full length of a group of primitives of the fluidic die to sense an average temperature of primitives within the group of primitives.

Examples described herein also provide a method of calibrating zonal temperatures within a fluidic die. The method may include transmitting a voltage that corresponds to a reference temperature from a reference temperature sensor to at least one zone of the fluidic die, the zone comprising a calibration loop circuit, resetting an offset counter within the calibration loop circuit, and transmitting a number of clock pulses to the offset counter. A voltage from a summing amplifier of the calibration loop circuit may be compared with the voltage provided by the reference temperature sensor using a comparator of the calibration loop circuit.

The comparison of an adjusted voltage from the summing amplifier with the voltage provided by the reference temperature sensor may be iterated a number of times. The adjusted voltage includes the voltage from the summing amplifier plus an offset voltage from the offset counter and DAC. A voltage signal that represents a calibrated temperature sensed in that zone may be sent to control logic.

The at least one zone may include a plurality of zones, and each zone may include a calibration loop circuit. The calibration of the zonal temperatures within the fluidic die may be performed upon power-up of the die. The calibration of the zonal temperatures within the fluidic die may be performed during a quiescent period of the fluidic die.

Comparing the voltage from the summing amplifier with the voltage provided by the reference temperature sensor may include, with the summing amplifier, outputting the voltage from the summing amplifier representative of a voltage from a zone temperature sensor. Comparing the voltage from the summing amplifier with the voltage provided by the reference temperature sensor may also include, with the comparator, comparing the voltage from the summing amplifier with the voltage provided by the reference temperature sensor, and, with the offset counter, incrementing or decrement by a value based on a difference between the voltage provided by the reference temperature sensor and the voltage from the zone temperature sensor. A digital-to-analog converter (DAC) may convert the output of the offset counter to an offset voltage and send the offset voltage to the summing amplifier. For a number of iterations, the summing amplifier may sum the offset voltage with the voltage from the zone temperature sensor, and the comparator may compare the summed voltage with the voltage provided by the reference temperature sensor.

The method may also include, with a sample and hold device, sampling the voltage provided by the reference temperature sensor, and holding a value defining the voltage provided by the reference temperature sensor at a constant level for a period of time.

Examples described herein also provide a fluidic die. The fluidic die may include at least two zones within the fluidic die. Each zone may include at least one fluid chamber, at least one actuator located within the fluid chamber, and at least one fluid passageway fluidically coupled to the fluid chamber. Each zone of the fluidic die may also include a summing amplifier to output a voltage representative of a voltage from a zone temperature sensor, and a comparator to compare the voltage from the summing amplifier with a voltage provided by a reference temperature sensor. Each zone may also include an offset counter to increment by a value based on a difference between the voltage provided by the reference temperature sensor and the voltage from the summing amplifier, a digital-to-analog converter (DAC) to convert the output of the offset counter to an offset voltage and sending the offset voltage to the summing amplifier. For a number of iterations, the summing amplifier may sum the offset voltage with the voltage from the zone temperature sensor to obtain an adjusted voltage, and the comparator is to compare the adjusted voltage with the voltage provided by the reference temperature sensor.

The fluidic die may also include a reference temperature sensor to sense a reference temperature, and a calibration voltage generator to generate a calibration voltage based on the sensed reference temperature. The calibration voltage defines the voltage provided by a reference temperature sensor. The fluidic die may also include a sample and hold device to sample the calibration voltage, hold a value defining the calibration voltage at a constant level for a period of time; and provide the calibration voltage to the comparator. The summing amplifier may send a signal defining a calibrated temperature of the zone when calibration has been completed. In another example, the summing amplifier may send a signal to control logic identifying that the zone is calibrated in response to a determination that the voltage from the summing amplifier is equal to the voltage provided by the reference temperature sensor within a threshold.

Turning now to the figures, FIG. 1 is a block diagram of a fluidic die (100), according to an example of the principles described herein. The fluidic die may include at least two zones (101-1, 101-2, collectively referred to herein as 101). The zones (101) may be non-physical divisions within the fluidic die (100) that allow for temperatures of the zones to be calibrated and measured. The measuring of temperatures of different zones (101) within the fluidic die (100) allow for the overall temperature of the fluidic die to be controlled such that the temperature across all zones (101) is consistent and uniform. The measuring of temperatures of different zones (101) within the fluidic die (100) also allows for the fluidic die (100) to compensate for temperature variation by, for example, modulating actuation energy of fluid actuators (FIG. 6, 602) and temperature adjusting devices (FIG. 6, 607), for example, as a function of temperature.

The ellipses below zone (101-2) indicates that the fluidic die (100) includes at least two zones (101), and may include a plurality or more zones (101). In one example, the fluidic die (100) may include three zones (101) to allow for the temperature of the fluidic die (100) to be measured at a first end, a middle, and a second end, and to allow for each of these zones to be calibrated to obtain a consistent and uniform temperature measurement across the fluidic die (100). In another example, the number of zones (101) may be based on the number of primitives within the fluidic die (100). Fluidic die (100) may include a plurality of fluid actuators used to move fluid within or eject the fluid from the fluidic die, and these fluid actuators may be grouped together into a plurality of primitives. In one example, the number of fluid actuators in each primitive may vary from primitive to primitive. In another example, the number of fluid actuators may be the same for each primitive. Thus, in these examples, the number of zones (101) may be equivalent to or based on the number of primitives within the fluidic die (100). In one example, the fluidic die (100) may be divided into between approximately two and 120 zones.

Because the fluidic die (100) includes manufacturing inconsistencies throughout, each zone (101) also includes these manufacturing inconsistencies. Examples of a manufacturing inconsistencies may include inconsistencies in materials from which the fluidic die (100) is made, different actuators that have variations in operating temperatures, different heating devices used to heat the fluidic die (100) that have variations in operating temperatures, other variations along the entire length and width of the fluidic die (100), or combinations thereof.

The fluidic die (100) may include a reference temperature sensor (102) communicatively coupled to each zone (101). The reference temperature sensor (102) may be any device capable of sensing a temperature of the fluidic die (100), and may include a sensor that extends along a length of the fluidic die (100). Examples of temperature sensors include thermally sensitive resistive elements, thermistors, resistance temperature coefficient (NTC) thermistors, thermocouplers, semiconductor-based thermal sensors which exhibit temperature-sensitive voltage versus current characteristics, other temperature sensors, or combinations thereof. The reference temperature sensor provides a signal to a calibration voltage generator (103) communicatively coupled between the zones (101) and the reference temperature sensor (102). The calibration voltage generator (103) generates a calibration voltage based on the signal from the reference temperature sensor (102). In one example, the temperature sensor (102) may detect the temperature of the fluidic die (100) at a set point time in when it is known that the whole fluidic die (100) is at the same temperature. This set point temperature of the fluidic die (100) may be measured at, for example, before a number of actuators that produce heat within the fluidic die (100) are activated, at a quiescent period of operation of the fluidic die (100), at the startup of a printing device in which the fluidic die (100) is incorporated, on power down of a printing device in which the fluidic die (100) is incorporated, at other times when the temperature of the fluidic die (100) is uniform through the fluidic die (100) or combinations thereof.

The voltage from the calibration voltage generator (103) may be sent to a number of calibration loop circuits (104) within the fluidic die (100), In one example, a calibration loop circuit (104) may be included in the fluidic die (100). In this example, the global calibration loop circuit (104) may be coupled to a temperature sensor located in each zone (101). In another example, each zone (101) may include its own calibration loop circuit (104). In this example, the calibration voltage generator (103) may be coupled to each calibration loop circuit (104) of each zone (101). In both of these examples, the calibration loop circuit (104) is associated with each zone (101) to calibrate the temperature sensors at each zone (101) based on a voltage provided by the reference temperature sensor (102). More details with regard to the calibration loop circuit(s) (104) will be described in connection with FIGS. 2 and 3.

Figure 2:
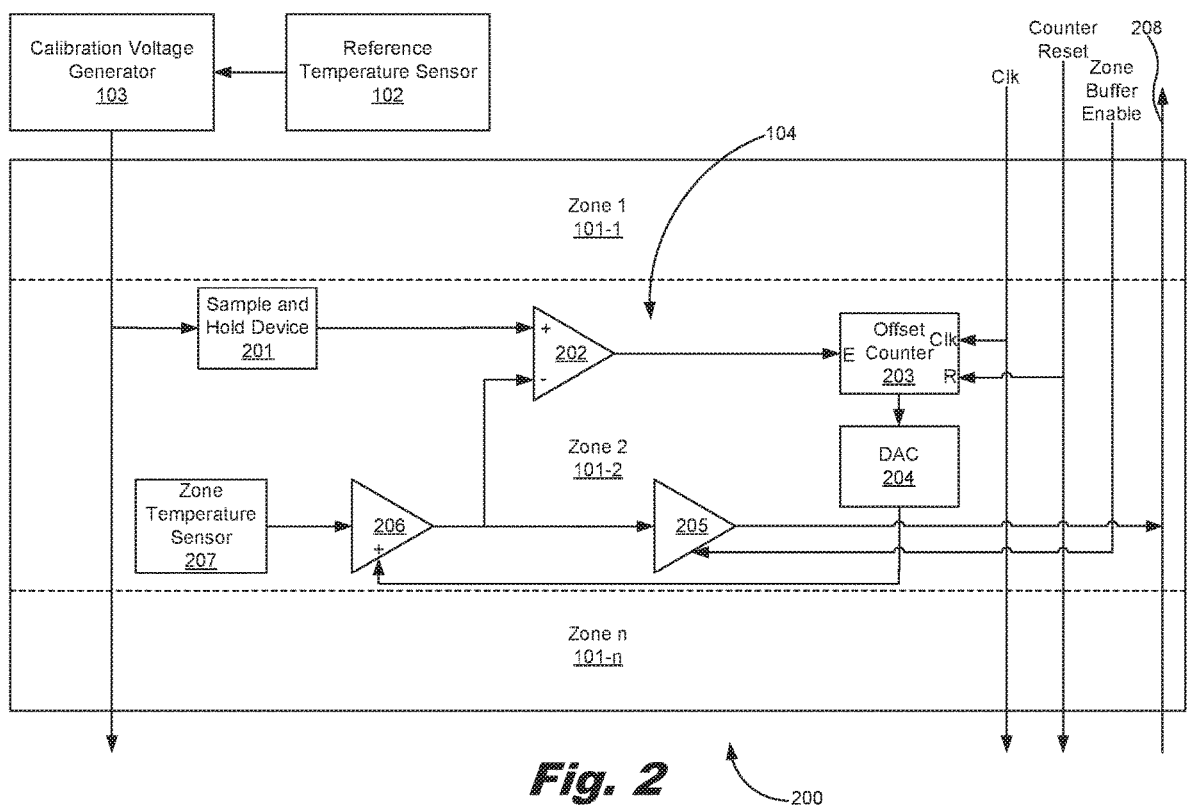
FIG. 2 is a circuit diagram of a fluidic die, according to an example of the principles described herein.

FIG. 2 is a circuit diagram of a fluidic die (200), according to an example of the principles described herein. Those elements within FIG. 2 that are similarly numbered with respect to FIG. 1 indicate similar elements, and their description is provided herein in connection with FIG. 1. The example of FIG. 2 describes an example where each zone (101) within the fluidic die (200) includes its own calibration loop circuit (104). Although one calibration loop circuit (104) is depicted in connection with Zone 2 (101-2), each zone (101) in the fluidic die (200) includes a calibration loop circuit (104).

The calibration loop circuit (104) may include a comparator (202). The comparator (202) may be any circuit or device that compares the voltage from the calibration voltage generator (103) to the output of a summing amplifier (206). A difference value is determined by the comparator (202), and that difference value is sent to an offset counter (203) in order to determine an adjustment value that compensates for the difference value. The output of the comparator (202) may be input at an enable pin (E) at the offset counter (203). The offset counter (203) may be any circuit or device that increments, decrements, or otherwise changes a value based on whether the voltage from the calibration voltage generator (103) is higher or lower than the output of a summing amplifier (206). In one example, if the voltage from the calibration voltage generator (103) is higher than the output of a summing amplifier (206), then the offset counter (203) may be enabled to count one clock pulse, which places a "1" in a register of the offset counter (203), In this example, if the voltage from the calibration voltage generator (103) is lower than the output of a summing amplifier (206), then the offset counter (203) may not count one clock pulse.

With a "1" in a register of the offset counter (203), a digital-to-analog converter (DAC) (204) may convert the output of the offset counter (203) to an offset voltage and send the offset voltage to the summing amplifier (206). One input of the summing amplifier (206) is a zone temperature sensor (207) local to the particular zone in which the summing amplifier (206) and other elements of the calibration loop circuit (104) is located. The output of the zone temperature sensor (207) is what is sought to be calibrated relative to the reference temperature sensor (102). The DAC (204) converts the "1" held in the register of the offset counter (203) into an adjusting voltage that serves as an adjustment value to the signal output by the zone temperature sensor (207) and summing amplifier (206). This adjustment value is added to the output of the zone temperature sensor 207 in the summing amplifier (206).

The summing amplifier (206) may be any operational amplifier that sums at least two voltages. Thus, the summing amplifier (206) sums the voltage obtained from the zone temperature sensor (207) and the adjusting voltage from the DAC (204). The zone temperature sensor (207) may be any device that can detect a temperature and output that sensed temperature in the form of a voltage. Examples of temperature sensors that the zone temperature sensor (207) may be include thermally sensitive resistive elements, thermistors, resistance temperature coefficient (NTC) thermistors, thermocouplers, semiconductor-based thermal sensors including temperature-sensitive voltage versus current characteristics, other temperature sensors, or combinations thereof.

The summing amplifier (206) sums the voltages from the DAC (204) and the zone temperature sensor (207), and outputs that summed and adjusted voltage back to the comparator (202) for comparison to the voltage from the calibration voltage generator (103). This looping of the voltages through the comparator (202), offset counter (203), DAC (204), summing amplifier (206), and back to the comparator (202) may occur any number of times until the difference between the voltage from the calibration voltage generator (103) and the summing amplifier (206) are the same or are within a threshold voltage of one another. In one example, the threshold may be set such that the difference in voltage from the calibration voltage generator (103) and the summing amplifier (206) is not significant enough to cause the temperatures of the fluidic die (100) to be non-uniform for functionality purposes, or so that it may be used to compensate for temperature non-uniformities. In either case, the threshold may be set so that the temperature at each zone (101) may be measured with sufficient accuracy.

Each zone observes the calibration voltage from the calibration voltage generator (103) and compares it to the output of its own zone temperature sensor (207). In one example, the zone temperature sensor (207) may be initially adjusted with an offset, and, in one example, this initial offset may be zero. Further, in one example, the calibration voltage from the calibration voltage generator (103) may be set to ensure that it will be higher than or equal to the low end of a sensor variation range. In this example, an initial comparison via the comparator (202) will yield an adjusted voltage from the offset counter (203) and DAC (204) that is an "increase" signal. This increase signal will cause the offset counter (203) that is initially reset to zero to increment by a value such as one or another quantum. The output of the offset counter (203) is sent to the DAC (204) as described herein.

With reference again to the offset counter (203), a clock signal may be sent to each offset counter (203) in each zone (101). The clock signal may be sent from any circuit or device that oscillates between a high and a low state to coordinate the actions of the offset counter (203). The clock signal may be input into the offset counter (203) at a clock pin (Clk) of the offset counter (203). Further, the offset counter (203) may include a reset pin (R) used to reset the offset counter (203) and clear the register of the offset counter (203). A counter reset signal may be sent to the offset counter (203) when a new calibration operation is to occur such as before a number of actuators that produce heat within the fluidic die (100) are activated, at a quiescent period of operation of the fluidic die (100), at the startup of a printing device in which the fluidic die (100) is incorporated, on power down of a printing device in which the fluidic die (100) is incorporated, at other times when the temperature of the fluidic die (100) is uniform through the fluidic die (100) or combinations thereof.

In one example, the fluidic die (100) may provide the offset counter (203) with a string of Clk pulses equal to a highest value the offset counter (203) can count to. In another example, the offset counter (203) may be a state machine where the offset counter (203) is enabled and disabled. Each zone's (101) offset counter (203) may count those pulses that arrive when the comparator (202) for that zone (101) registers that the zone's (101) adjusted temperature voltage is lower than the calibration temperature voltage from the calibration voltage generator (103). After the string of Clk pulses has occurred, each zone (101) may have a calibration value stored in its offset counter (203) that will provide the appropriate offset voltage to calibrate the zone temperature sensor (207). That calibrated temperature voltage may then be used to, for example, control warming of the zone (101) using heaters or other devices and techniques in order to bring the zone (101) to a desired operating temperature. In one example, the clock signal (Clk) is produced by a clock generator.

The offset counter (203) and DAC (204) may have a calibration resolution that allows for thermal control across the length and width of the fluidic die (100). In one example, the offset counter (203) and DAC (204) would include between three and five bits. In an example where the offset counter (203) and DAC (204) include three bits, the offset counter (203) may have eight quanta of adjustment. In an example where the offset counter (203) and DAC (204) include five bits, the offset counter (203) may have 32 quanta of adjustment. Thus, the higher the number of bits included in the offset counter (203) and DAC (204), the higher the number of quanta of adjustment the offset counter (203) and DAC (204) can perform.

The calibration loop circuit (104) may also include a decoupling buffer (205). The decoupling buffer (205) may be any circuit or device that allows one of the zones (101) to couple to the analog bus (208) at a time. A zone buffer enable signal may be provided to each decoupling buffer (205) to enable input to the decoupling buffer (205). The signal provided by the decoupling buffer (205) allows the fluidic die (100) or other device to monitor that zone's (101) temperature. In other examples, the output of the calibration loop circuit (104) may be used to indicate to control circuitry that the zone's (101) temperature is or is not calibrated with respect to the reference temperature sensor (102), test the calibration loop circuit (104) of that zone (101), other processes, or combinations thereof, and this information may be transmitted along the analog bus (208) or another signal transmission line to control circuitry. The analog bus (208) may be communicatively coupled to control circuitry that controls a number of heating devices to heat the zones (101) of the fluidic die (100). Further, the control circuitry may control the calibration processes of the zone temperature sensors (207) of each zone (101) including when the calibration process is to occur, how often the calibration process is to occur, other controllable processes, or combinations thereof.

In one example, the offset counter (203) may include non-volatile memory to store the result of a calibration process including the number of iterations used to calibrate the zone temperature sensor (207), the adjusted voltages that are output to the DAC (204), a final difference value that is output from the comparator (202) to the offset counter (203) before the calibration is complete, other data, or combinations thereof. Use of non-volatile memory allows the offset counter (203) to retain the calibration data after a powering off of the fluidic die (100) and the offset counters (203) of the zones (101).

In one example, the elements of the calibration loop circuit (104) may be incorporated into a number of integrated circuits that is less than a total of the number of elements within the calibration loop circuit (104). For example, the comparator (202) and the summing amplifier (206) may be incorporated into a common integrated circuit.

In one example, the calibration loop circuit (104) may include a sample and hold device (201). The sample and hold device (201) may be any circuit or device that samples the voltage from the calibration voltage generator (103) and is capable of holding that voltage for a period of time. In one example, the sample and hold device (201) may include a capacitor that holds the calibration voltage from the calibration voltage generator (103) indicative of the reference temperature form the reference temperature sensor (102) at a constant level and for a period of time.

Figure 3:
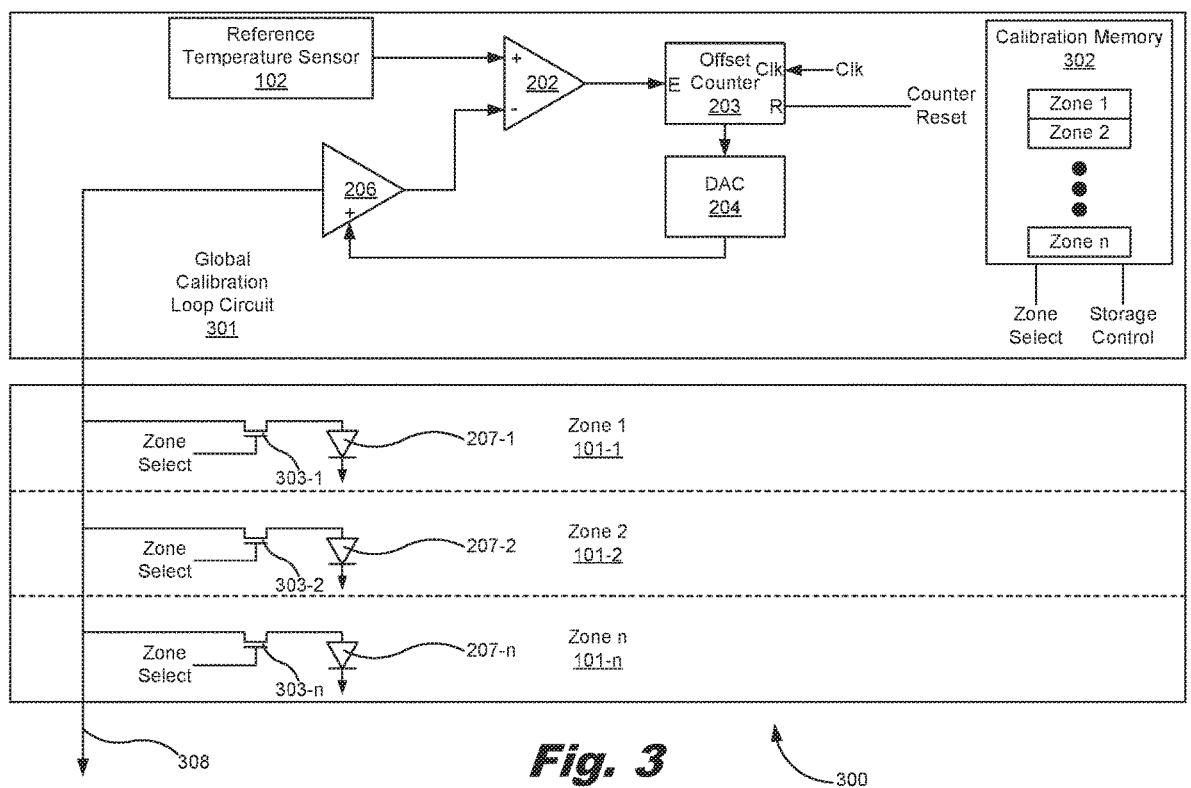
FIG. 3 is a circuit diagram of a fluidic die, according to another example of the principles described herein.

FIG. 3 is a circuit diagram of a fluidic die (300), according to another example of the principles described herein. The example of FIG. 3 depicts one global calibration loop circuit (304) for the entire fluidic die (300) as opposed to a calibration loop circuit (104) for each zone (101) as depicted in FIG. 2. Those elements within FIG. 3 that are similarly numbered with respect to FIGS. 1 and 2 indicate similar elements, and their description is provided herein in connection with FIGS. 1 and 2. The reference temperature sensor (102) in the global calibration loop circuit (304) of FIG. 3 may be located at an end of the fluidic die (300) and not in a column of fluid actuators. The reference temperature sensor (102) produces an analog voltage that represents the known stable temperature of the fluidic die (300) captured at a time during which the temperature of the fluidic die (300) is consistent across the fluidic die (300), and during a quiescent state of the fluidic die (300) when most circuits within the fluidic die (300) are powered down and the fluid ejection actuators are not active. In this manner, the whole fluidic die (300) may be maintained at a steady, consistent temperature during a calibration process of the fluidic die (300). The reference temperature sensor (102) may be, for example, a whole fluidic die thermal sense resistor (TSR) or other temperature sensing device that serves as a global reference temperature sensor (102).

The global calibration loop circuit (301) of FIG. 3 calibrates each zone (101) by selecting the zones (101) in sequence. Each zone (101) is selected in turn via a zone select signal input to the pass gates (303) of the various zones (101). The summing amplifier (206) of the global calibration loop circuit (301) receives the voltage from each zone's (101) temperature sensors (207-1, 207-2, 207-n, collectively referred to herein as 207). Each zone temperature sensor (207) includes a zone select line through which the global calibration loop circuit (301) may select a particular zone (101). In one example, each zone temperature sensor (207) may be coupled to a pass gate (303-1, 303-2, 303-3, collectively referred to herein as 303) that, when activated, allows a voltage representing a temperature from the selected zone's temperature sensor (207) to pass to the global calibration loop circuit (301).

This voltage from a selected zone temperature sensor (207) is input to the summing amplifier (206), and the voltage from the reference temperature sensor (102) is compared to the output of the summing amplifier (206) at the comparator (202). A difference value is determined by the comparator (202), and that difference value is sent to the offset counter (203) in order to determine an adjustment value that compensates for the difference value. The output of the comparator (202) may be input at the enable pin (E) at the offset counter (203).

In one example, if the voltage from the reference temperature sensor (102) is higher than the output of the summing amplifier (206), then the offset counter (203) may be enabled to count one clock pulse, which places a "1" in a register of the offset counter (203). In this example, if the voltage from the reference temperature sensor (102) is lower than the output of a summing amplifier (206), then the offset counter (203) may not count one clock pulse and either increment or decrement the value in the offset counter (203). With a "1" in a register of the offset counter (203), a digital-to-analog converter (DAC) (204) may convert the output of the offset counter (203) to an offset voltage and send the offset voltage to the summing amplifier (206).

The global calibration loop circuit (304) may, for a number of iterations, process the input voltage from the selected zone's temperature sensor (207) until a calibration value representing the amount of adjustment for the selected zone's temperature sensor (207) is obtained. The calibration value for the selected zone (101) may be stored in calibration memory (302) located on the fluidic die (300). Each zone (101) and its respective temperature sensor (207) may include a storage location or address within the calibration memory (302) specific to that zone (101) for its respective calibration value to be stored. In one example, the calibration memory (302) is non-volatile memory that holds its state and can retrieve stored information even after having been power cycled (i.e., after the power has been turned off and back on). The stored calibration values for each zone (101) may be used to control warming of the zones through heating devices throughout the zones (101).

In another example, the fluidic die (300) may not include a calibration memory (302). In this example, the calibration values for each individual zone (101) may be stored in a register of the offset counter (203).

Figure 4:
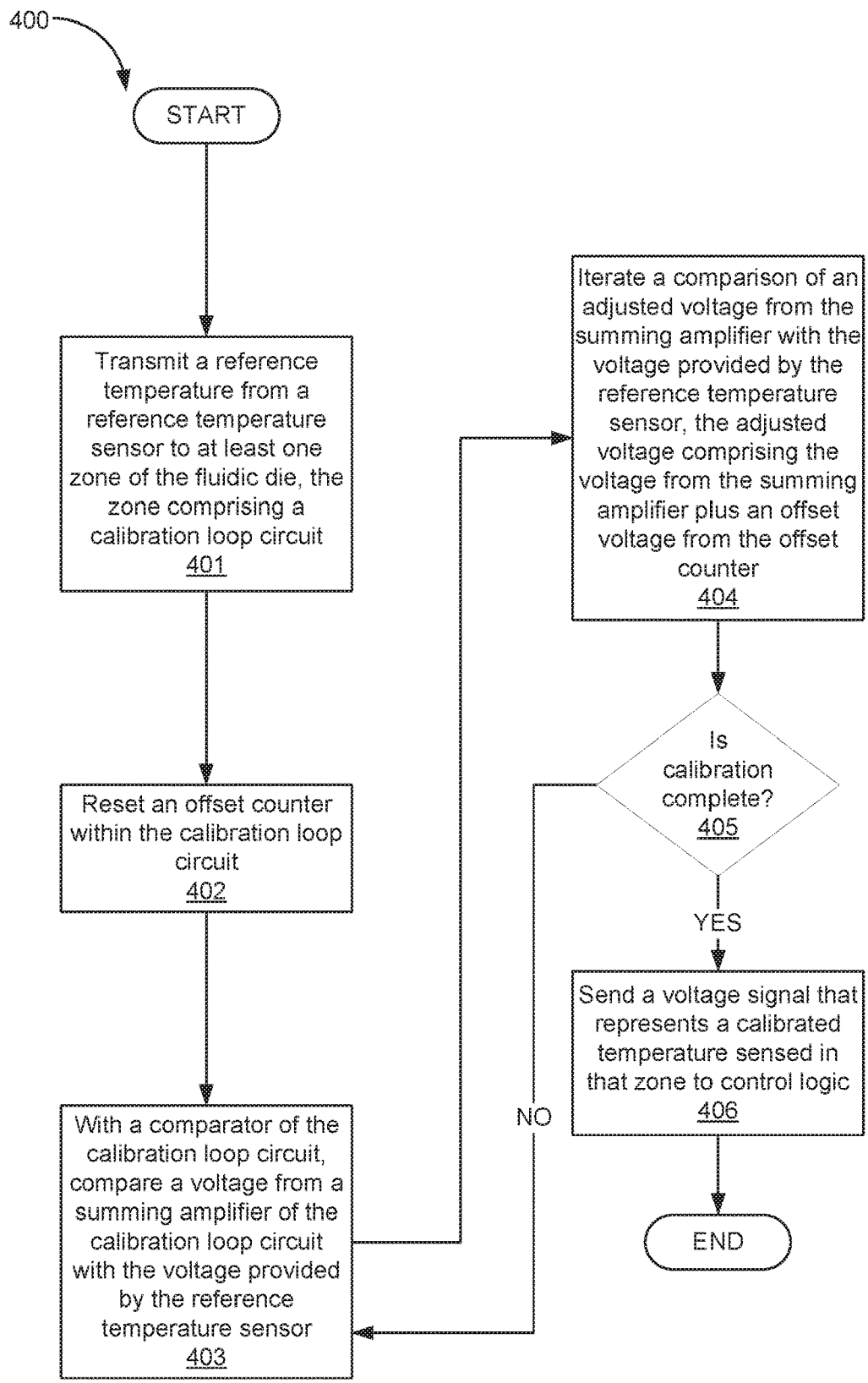
FIG. 4 is a flowchart showing a method of calibrating zonal temperatures within a fluidic die, according to an example of the principles described herein.

FIG. 4 is a flowchart showing a method (400) of calibrating zonal temperatures within a fluidic die (100, 200, 300, collectively referred to herein as 100) according to an example of the principles described herein. The method (400) may include transmitting (block 401) a reference temperature from a reference temperature sensor (102) to at least one zone (101) of the fluidic die (100). The zone (101) includes a calibration loop circuit (104). An offset counter (203) within the calibration loop circuit (104) may be reset (block 402). A voltage from a summing amplifier (206) of the calibration loop circuit (104) may be compared (block 403) with the voltage provided by the reference temperature sensor (102) using a comparator (202) of the calibration loop circuit (104).

The comparison of an adjusted voltage from the summing amplifier (206) with the voltage provided by the reference temperature sensor (102) may be iterated (block 404) a number of times. The adjusted voltage includes the voltage from the summing amplifier (206) plus an offset voltage from the offset counter (203). In one example, the method may loop back to block 403 any number of iterations if the calibration is not complete (block 405, determination NO), and until the calibration is complete (block 405, determination YES).

Once calibration is complete (block 405, determination YES), a voltage signal that represents a calibrated temperature sensed in that zone (101) may be sent (block 406) to control logic, where the control logic may use the calibrated temperatures to adjust the temperature of the zones (101) within the fluidic die (100) to obtain a consistent temperature through the length and width of the fluidic die (100).

Figure 5:
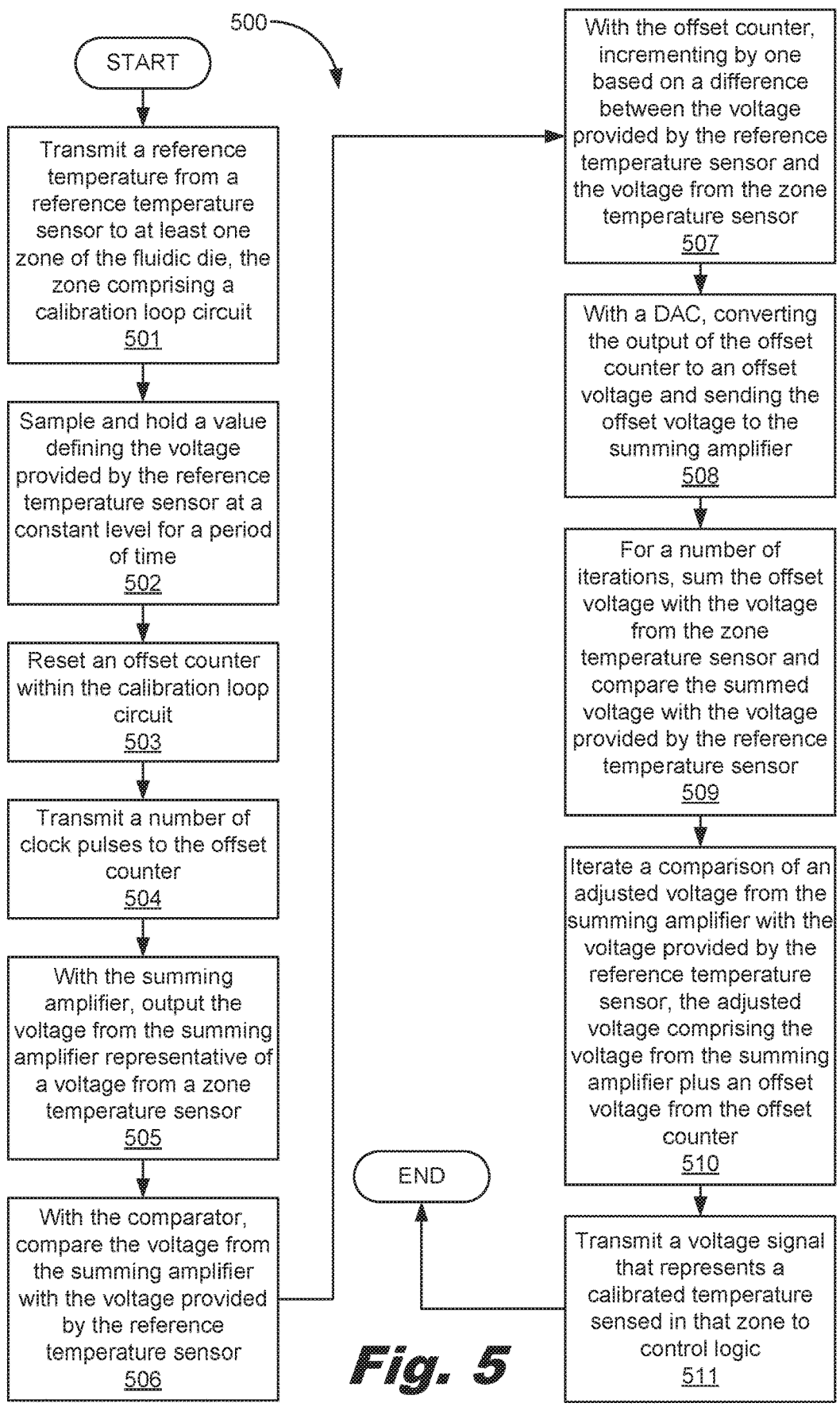
FIG. 5 is a flowchart showing a method of calibrating zonal temperatures within a fluidic die, according to another example of the principles described herein.

FIG. 5 is a flowchart showing a method (500) of calibrating zonal temperatures within a fluidic die (100), according to another example of the principles described herein. The method of FIG. 5 may include transmitting (block 501) a reference temperature from a reference temperature sensor (102) to at least one zone (101) of the fluidic die (100). The zone (101) includes a calibration loop circuit (104). The sample and hold device (201) samples and holds (block 502) a value defining the voltage provided by the reference temperature sensor (102) at a constant level for a period of time. A reset signal may be transmitted to the offset counter (203) within the calibration loop circuit (104) to reset (block 503) the offset counter (203). Also, a number of clock pulses may be transmitted (block 504) to the offset counter (203).

The voltage from the summing amplifier (206) representative of a voltage from a zone temperature sensor (207) may be output (block 505) to the comparator (202), and the comparator (202) may compare (block 506) the voltage from the summing amplifier (206) with the voltage provided by the reference temperature sensor (102). The offset counter (203) may increment (block 507) by a value based on a difference between the voltage provided by the reference temperature sensor (102) and the voltage provided from the zone temperature sensor (207) and summing amplifier (206).

The offset counter (203) may output a signal to the DAC (204), and the DAC (204) may convert (block 508) that output to an offset voltage and send the offset voltage to the summing amplifier (206). As described herein, for a number of iterations the summing amplifier (206) sums (block 509) the voltage from the zone temperature sensor (207) and the offset voltage from the DAC (204), and the comparator (202) compares the summed voltage with the voltage provided by the reference temperature sensor (102). The method (500) may iterate (block 510) a comparison of an adjusted voltage from the summing amplifier (206) with the voltage provided by the reference temperature sensor (102) where the adjusted voltage includes the voltage from the summing amplifier (206) plus the offset voltage from the offset counter (203) and DAC (204).

Eventually, through a number of iterations, a voltage signal representing a calibrated temperature sensed in the zone (101) may be transmitted (block 511) to control logic. The control logic may use the calibrated temperatures to adjust the temperature of the zones (101) within the fluidic die (100) to obtain a consistent temperature through the length and width of the fluidic die (100), or to compensate for temperature variations or non-uniformities.

Figure 6:
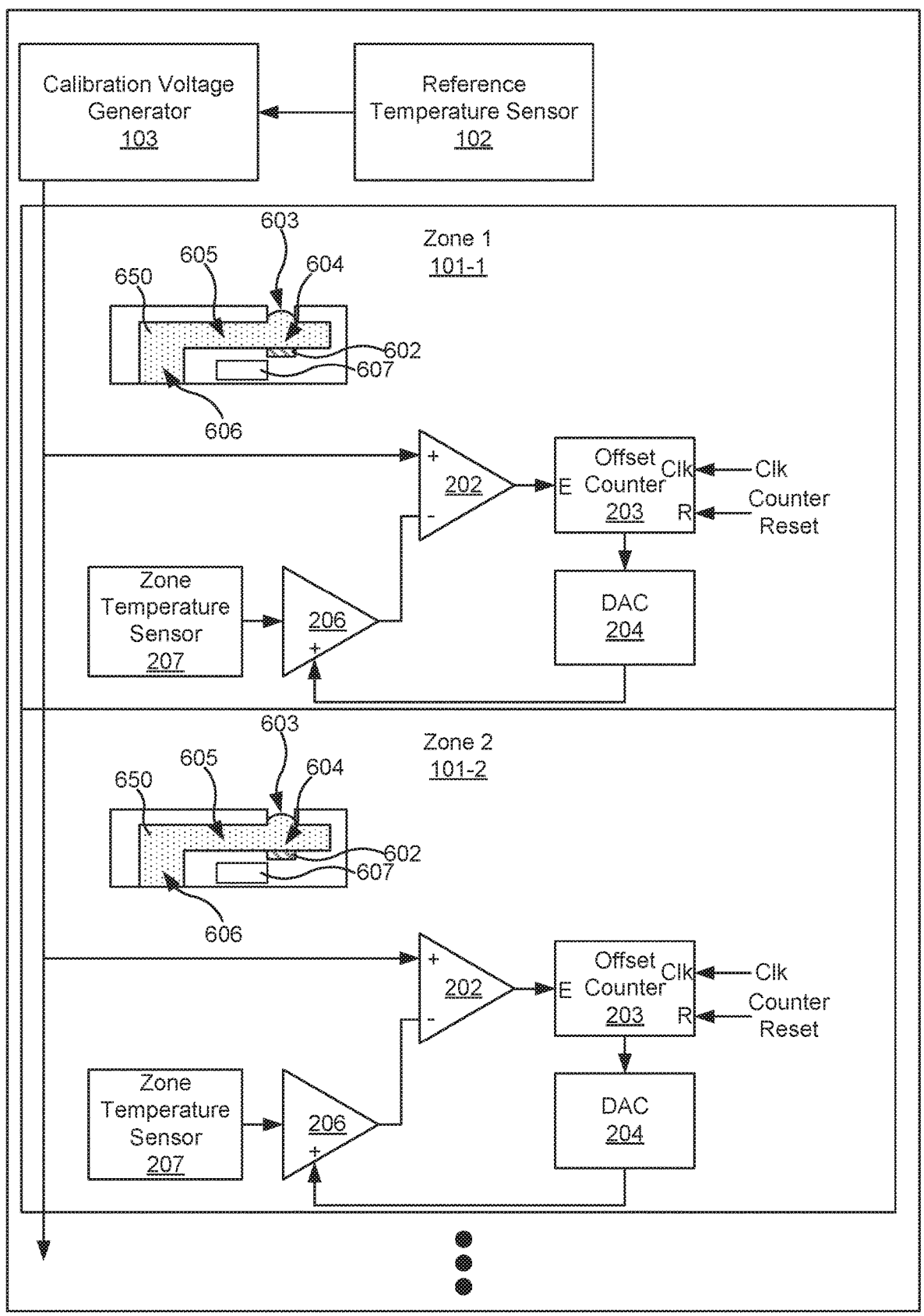
FIG. 6 is a block and circuit diagram of a fluidic die, according to an example of the principles described herein.

FIG. 6 is a block and circuit diagram of a fluidic die (600), according to an example of the principles described herein. Those elements within FIG. 6 that are similarly numbered with respect to FIGS. 1 through 3 indicate similar elements, and their description is provided herein in connection with FIGS. 1 through 3. The fluidic die (600) of FIG. 6 may include a number of passageways, channels, and chambers in which a fluid (650) circulates or moves. In one example, a number of fluid slots (606) may be used to deliver fluid to a number of fluid channels (605) and into a number of fluid ejection chambers (604). Each zone (101) may include at least one fluid ejection chamber (604).

Each of the fluid ejection chambers (604) may include a fluid actuator (602) used to, for example, eject a volume of the fluid (650) from the ejection chamber (604), out a nozzle (603), and onto a media, or move fluid within the passageways of the fluidic die (100). The fluid actuators (602) may be, for example, thermal heating devices used to form a drive bubble of vaporized fluid separated from liquid fluid by a bubble wall. The drive bubble may be used to force the fluid from the fluid ejection chamber (604) and out the nozzle (603). Once the drive bubble collapses, additional fluid from a reservoir may flow into the fluid slots (606), fluid channels (605), and fluid ejection chambers (604), replenishing the lost fluid volume from the creation of the drive bubble and the ejection of the fluid. This process may be repeated each time the fluidic die (600) is instructed to eject fluid. In another example, the fluid actuators (602) may be piezoelectric actuators to generate a pressure pulse that forces a volume of the fluid out of the nozzle (603). In this example, the piezoelectric actuators may include a piezoelectric material that has a polarization orientation that provides a motion into the fluid ejection chambers (604) when and electrical charge is applied to the piezoelectric material.

The number of zones (101) may be based on the number of primitives within the fluidic die (600). The fluidic die (600) may include a plurality of fluid actuators (602) used to move fluid (650) within or eject the fluid from the fluidic die (600), and these fluid actuators (602) may be grouped together into a plurality of primitives. In one example, the number of fluid actuators (602) in each primitive may vary from primitive to primitive. In another example, the number of fluid actuators (602) may be the same for each primitive. Thus, in these examples, the number of zones (101) may be equivalent to or based on the number of primitives within the fluidic die (600).

A number of temperature adjusting devices (607) may be included among the zones (101) of the fluid die (600). A voltage signal that represents the calibrated temperature sensed in that zone (101) may be sent to control logic, where the control logic may use the calibrated temperatures and the control the temperature adjusting devices (607) to adjust the heat of the zones (101) within the fluidic die (600) to obtain a consistent temperature through the length and width of the fluidic die (600). The fluidic die (600) may include any number of temperature adjusting devices (607) within each zone (101).

Figure 7:
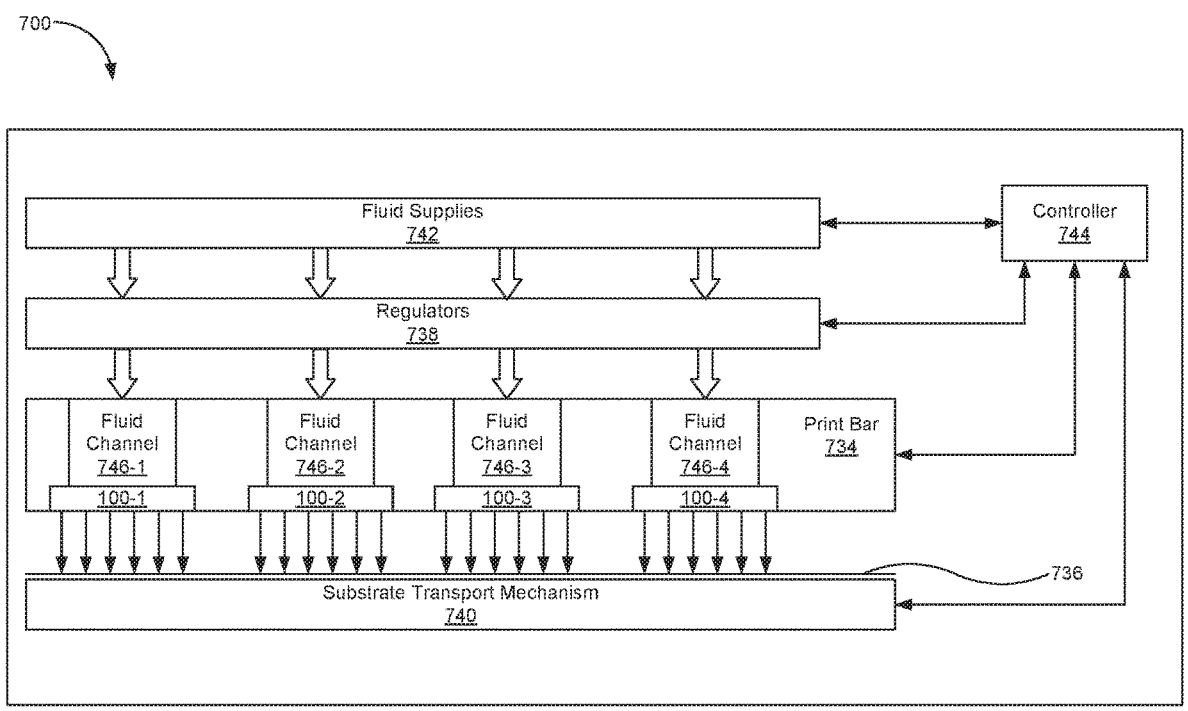
FIG. 7 is a block diagram of a printing device including a number of fluidic die, according to an example of the principles described herein.

FIG. 7 is a block diagram of a printing device (700) including a number of fluidic die (100), according to an example of the principles described herein. The printing device (700) may include a print bar (734) spanning the width of a print substrate (736), a number of flow regulators (738) associated with the print bar (734), a substrate transport mechanism (740), printing fluid supplies (742), and a controller (744). The controller (744) represents the programming, processor(s), and associated memories, along with other electronic circuitry and components that control the operative elements of the printing device (700) and the activation of the calibration loop circuits (104) within the various examples of FIGS. 1 through 3 and 6. The print bar (734) may include an arrangement of fluidic ejection dies (100) for dispensing fluid onto a sheet or continuous web of paper or other print substrate (736). Each fluid ejection die (100) receives fluid through a flow path that extends from the fluid supplies (742) into and through the flow regulators (738), and through a number of fluid channels (746) defined in the print bar (734).

The controller (744) controls the activation of the all of the elements within the calibration loop circuits (104), controls the receipt of signals from the calibration loop circuits (104) within each zone (101) or within the global calibration loop circuit (301), controls the clock (Clk) signals, counter reset (R) signals, zone select signals, storage control signals, signals activating the pass gates (303), signals transmitted along the analog buses (208, 308), and other signals transmitted within the various examples described herein. The controller (744) also controls the activation of the temperature adjusting devices (607) based on the calibrated temperatures to adjust the heat of the zones (101) within the fluidic die (100) to obtain a consistent temperature through the length and width of the fluidic die (100). Further, the controller (744) includes the programming, processor(s), and associated memories to determine an operating temperature of the fluidic die (100), and cause the fluidic die (100) to have a consistent temperature throughout the length and width of the fluid die (100).

The specification and figures describe a fluidic die. The fluidic die may include at least two zones, a reference temperature sensor communicatively coupled to each zone, a calibration voltage generator coupled between the zones and the reference temperature sensor, and a calibration loop circuit associated with each zone to calibrate each zone based on a voltage provided by the reference temperature sensor.

The examples described herein decreases used space on the fluidic die by sharing circuitry and devices among many zones of the fluidic die. Further, the examples described herein allows a printhead or fluidic die to not be at an absolute known temperature during operations. Still further, the examples described herein allow a calibration processes and temperature control of a fluidic die to occur in real time since calibration circuit elements are dedicated to a zone and not shared among all zones.

Even still further, the examples described herein allow for several calibration circuit elements to be shared with a general temperature control functions within the zone. Further, the examples described herein allow for the fluidic die or printhead to not be at a known temperature, or to not know the temperature of the fluidic die or printhead to perform the calibration processes. Further, effects from electrical noise may be reduced by having most analog circuitry local to the fluidic die or the zones thereof.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluidic die, comprising:
   at least two zones;
   a reference temperature sensor communicatively coupled to each zone to output a voltage representative of a temperature of all the zones;
   a calibration voltage generator coupled between the zones and the reference temperature sensor; and
   a calibration loop circuit associated with each zone to calibrate a zone temperature sensor of each zone based on output provided by the reference temperature sensor;
   wherein a respective calibration loop circuit is located in each zone.

2. The fluidic die of claim 1, wherein the calibration loop circuit within each zone comprises:
   a summing amplifier to output a voltage representative of a voltage from a zone temperature sensor;
   a comparator to compare the voltage from the summing amplifier with the voltage provided by the reference temperature sensor;
   an offset counter to change state by a value based on a difference between the voltage provided by the reference temperature sensor and the voltage from the zone temperature sensor; and
   a digital-to-analog converter (DAC) to convert the output of the offset counter to an offset voltage and send the offset voltage to the summing amplifier,
   wherein, for a number of iterations:
   the summing amplifier sums the offset voltage with the voltage from the zone temperature sensor,
   the comparator compares the summed voltage with the voltage provided by the reference temperature sensor; and
   the offset counter changes state by the value based on the comparison between the summed voltage and the voltage provided by the reference temperature sensor.

3. The fluidic die of claim 2, comprising a sample and hold device to sample the voltage provided by the reference temperature sensor and hold a value defining the voltage provided by the reference temperature sensor at a constant level for a period of time.

4. The fluidic die of claim 1, wherein the at least two zones are equal to a number of primitives in the fluidic die.

5. The fluidic die of claim 1, comprising non-volatile memory, the non-volatile memory storing calibration data provided by the calibration loop circuit.

6. The fluidic die of claim 1, wherein the reference temperature sensor runs a full length of a group of primitives of the fluidic die to sense an average temperature of primitives within the group of primitives.

7. A method of calibrating zonal temperatures within a fluidic die comprising:
   transmitting a voltage that corresponds to a reference temperature from a reference temperature sensor to at least one zone of the fluidic die, the zone comprising a calibration loop circuit;
   resetting an offset counter within the calibration loop circuit;
   with a comparator of the calibration loop circuit, comparing a voltage from a summing amplifier of the calibration loop circuit with the voltage provided by the reference temperature sensor;
   iterating a comparison of an adjusted voltage from the summing amplifier with the voltage provided by the reference temperature sensor, the adjusted voltage comprising the voltage from the summing amplifier plus an offset voltage from the offset counter; and
   sending a voltage signal that represents a calibrated temperature sensed in that zone to control logic.

8. The method of claim 7, wherein the at least one zone comprises a plurality of zones, each zone comprising a calibration loop circuit.

9. The method of claim 7, wherein calibration of the zonal temperatures within the fluidic die is performed upon power-up of the die.

10. The method of claim 7, wherein calibration of the zonal temperatures within the fluidic die is performed during a quiescent period of the fluidic die.

11. The method of claim 7, wherein comparing the voltage from the summing amplifier with the voltage provided by the reference temperature sensor comprises:
    with the summing amplifier, outputting the voltage from the summing amplifier representative of a voltage from a zone temperature sensor;
    with the comparator, comparing the voltage from the summing amplifier with the voltage provided by the reference temperature sensor;
    with the offset counter, incrementing by a value based on a difference between the voltage provided by the reference temperature sensor and the voltage from the zone temperature sensor; and
    with a digital-to-analog converter (DAC), converting the output of the offset counter to an offset voltage and sending the offset voltage to the summing amplifier,
    wherein, for a number of iterations:
    the summing amplifier adjusts the voltage from the zone temperature sensor based on the offset voltage, and
    the comparator compares the summed voltage with the voltage provided by the reference temperature sensor.

12. The method of claim 11, comprising, with a sample and hold device:
    sampling the voltage provided by the reference temperature sensor; and
    holding a value defining the voltage provided by the reference temperature sensor at a constant level for a period of time.

13. A fluidic die comprising:
    at least two zones within the fluidic die, wherein each zone comprises:
    at least one fluid chamber;
    at least one actuator located within the fluid chamber;
    at least one fluid passageway fluidically coupled to the fluid chamber;
    a summing amplifier to output a voltage representative of a voltage from a zone temperature sensor;
    a comparator to compare the voltage from the summing amplifier with a voltage provided by a reference temperature sensor;
    an offset counter to increment by a value based on a difference between the voltage provided by the reference temperature sensor and the voltage from the summing amplifier;
    a digital-to-analog converter (DAC) to convert the output of the offset counter to an offset voltage and sending the offset voltage to the summing amplifier, wherein, for a number of iterations:
the summing amplifier is to adjust the voltage from the zone temperature sensor based on the offset voltage, and
the comparator is to compare the adjusted voltage with the voltage provided by the reference temperature sensor.

14. The fluidic die of claim 13, comprising:
a reference temperature sensor to sense a reference temperature;
a calibration voltage generator to generate a calibration voltage based on the sensed reference temperature, the calibration voltage defining the voltage provided by a reference temperature sensor;
a sample and hold device to:
sample the calibration voltage;
hold a value defining the calibration voltage at a constant level for a period of time; and
provide the calibration voltage to the comparator.

15. The fluidic die of claim 13, wherein the summing amplifier sends a signal to control logic identifying that the zone is calibrated in response to a determination that the voltage from the summing amplifier is equal to the voltage provided by the reference temperature sensor within a threshold amount.

16. The fluidic die of claim 1, wherein the reference temperature sensor comprises a whole fluidic die thermal sense resistor (TSR).

17. The fluidic die of claim 2, further comprising a counter reset line connected to each counter in each calibration loop circuit.

18. The fluidic die of claim 1, wherein each calibration loop circuit further comprises a decoupling buffer to control connection of each calibration loop circuit to an analog bus so that only one calibration loop circuit is communicating with the analog bus at a time.

19. The fluidic die of claim 5, wherein the memory stores a calibration value for each zone temperature sensor as determined using the reference temperature sensor at a time when the whole die is known to have a same temperature.

* * * * *